United States Patent
Bos et al.

(10) Patent No.: US 7,446,141 B2
(45) Date of Patent: Nov. 4, 2008

(54) THERMOPLASTIC COMPOSITION COMPRISING AN AROMATIC POLYCARBONATE AND/OR A POLYESTER WITH IMPROVED MOULD RELEASE BEHAVIOUR

(75) Inventors: Martinus L. M. Bos, Born (NL); Edwin A. A. Van Hartingsveldt, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 603 days.

(21) Appl. No.: 10/510,211

(22) PCT Filed: Mar. 19, 2003

(86) PCT No.: PCT/NL03/00203

§ 371 (c)(1),
(2), (4) Date: May 4, 2005

(87) PCT Pub. No.: WO03/087210

PCT Pub. Date: Oct. 23, 2003

(65) Prior Publication Data

US 2005/0234171 A1   Oct. 20, 2005

(30) Foreign Application Priority Data

Apr. 5, 2002   (EP) .................. 02076313

(51) Int. Cl.
*C08K 5/103*   (2006.01)
*C08K 5/01*    (2006.01)
*C08L 69/00*   (2006.01)

(52) U.S. Cl. .............. 524/387; 524/311; 524/386; 524/481; 524/537

(58) Field of Classification Search ........ 524/311, 524/481, 537, 387
See application file for complete search history.

(56) References Cited

U.S. PATENT DOCUMENTS

| 4,521,562 A | 6/1985 | Rosenquist |
| 4,626,566 A | 12/1986 | Miller |
| 5,717,021 A | 2/1998 | Huang |
| 5,959,063 A | 9/1999 | Huang |
| 2003/0096122 A1* | 5/2003 | Mercx et al. ............... 428/458 |

FOREIGN PATENT DOCUMENTS

| EP | 230 015 | 7/1987 |
| EP | 433 713 | 6/1991 |
| EP | 878 507 | 11/1998 |

* cited by examiner

*Primary Examiner*—Tae H Yoon
(74) *Attorney, Agent, or Firm*—Nixon & Vanderhye, PC

(57) ABSTRACT

The invention relates to a thermoplastic composition comprising (a) an aromatic polycarbonate and/or a polyester, and (b) an effective amount of a mould release agent containing (b1) a fatty acid ester of an aliphatic polyol having 2-6 hydroxy groups and an aliphatic $C_{10}$-$C_{36}$ carboxylic acid; and (b2) a saturated alpha-olefin oligomer of at least one $C_6$-$C_{18}$ alpha-olefin; the mass ratio of components (b1) and (b2) being from 1/9 to 9/1. With this thermoplastic composition a very regular injection moulding processing is possible, with lower release forces needed during demoulding of parts, and with shorter total moulding cycle-times. The invention further concerns the use of the thermoplastic composition according to the invention for injection moulding of articles and to moulded articles thus obtained.

12 Claims, 3 Drawing Sheets

Figure 1:
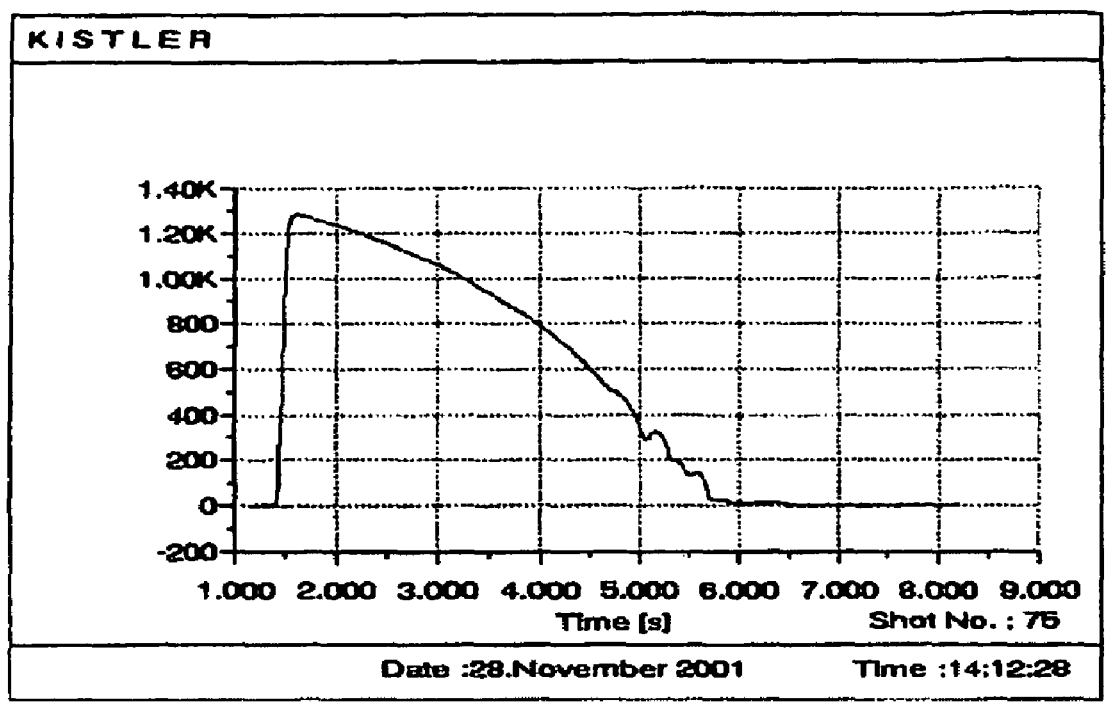

THERMOPLASTIC COMPOSITION COMPRISING AN AROMATIC POLYCARBONATE AND/OR A POLYESTER WITH IMPROVED MOULD RELEASE BEHAVIOUR

CROSS REFERENCE TO RELATED APPLICATION

This application is the National Phase of International Application PCT/NL03/00203 filed Mar. 19, 2003 which designated the U.S., and was published in the English language.

The invention relates to a thermoplastic composition comprising (a) an aromatic polycarbonate and/or a polyester, and (b) a mould release agent. The invention further concerns the use of the thermoplastic composition according to the invention for injection moulding of articles and to moulded articles thus obtained.

Such a thermoplastic composition is known from U.S. Pat. No. 4,626,566. In this patent publication a composition is disclosed that comprises an aromatic polycarbonate in an admixture with a mould release effective amount of a hydrogenated alpha-olefin oligomer fluid, preferably about 0.01-1 mass %. This composition is described to show better mould release behaviour than conventional agents, like pentaerythritol tetrastearate; that is lower ejection forces suffice to remove a moulded part from the opened mould of an injection moulding machine.

Effective mould release behaviour is a key property for a thermoplastic composition to enable efficient and economic processing into formed articles via injection moulding. Normally a mould release agent (MRA) needs to be added to a composition to enable such processing behaviour. In order to function effectively as a MRA, such agent or compound must be stable at the processing conditions so that it will not loose its effectiveness and/or cause discoloration, and must not chemically interact with the polymers and other components of the composition, or otherwise adversely affect the composition. In case of transparent or translucent polymers, the MRA should not deteriorate transparency. During injection moulding, the MRA should not form deposits on the surface of the mould, nor should it after moulding migrate to the surface of the part to such extent that it becomes visible on the surface, often called blooming. Identification of inert yet more effective release agents remains therefore a continuous subject of attention.

A disadvantage of the known thermoplastic composition described in U.S. Pat. No. 4,626,566 is, that it does not show problem-free mould release behaviour in every type of mould, especially not in moulds for relatively large parts or for parts with walls having little draft, causing irregular processing or high release forces, possibly resulting in distortion of an ejected part. Another disadvantage is that during demoulding of parts a squeaking noise may be made.

It is therefore an object of the present invention to provide a thermoplastic composition that shows a more regular processing behaviour, with lower release forces during demoulding of parts.

This object is achieved according to the invention with a thermoplastic composition that comprises 0.01-3 mass % of a mould release agent that contains (b1) a fatty acid ester of an aliphatic polyol having 2-6 hydroxy groups and an aliphatic $C_{10}$-$C_{36}$ carboxylic acid; and (b2) a saturated alpha-olefin oligomer of at least one $C_6$-$C_{18}$ alpha-olefin; with a mass ratio of components (b1) and (b2) of from 1/9 to 9/1.

BRIEF DESCRIPTION OF DRAWING FIGURES

Figure 2:
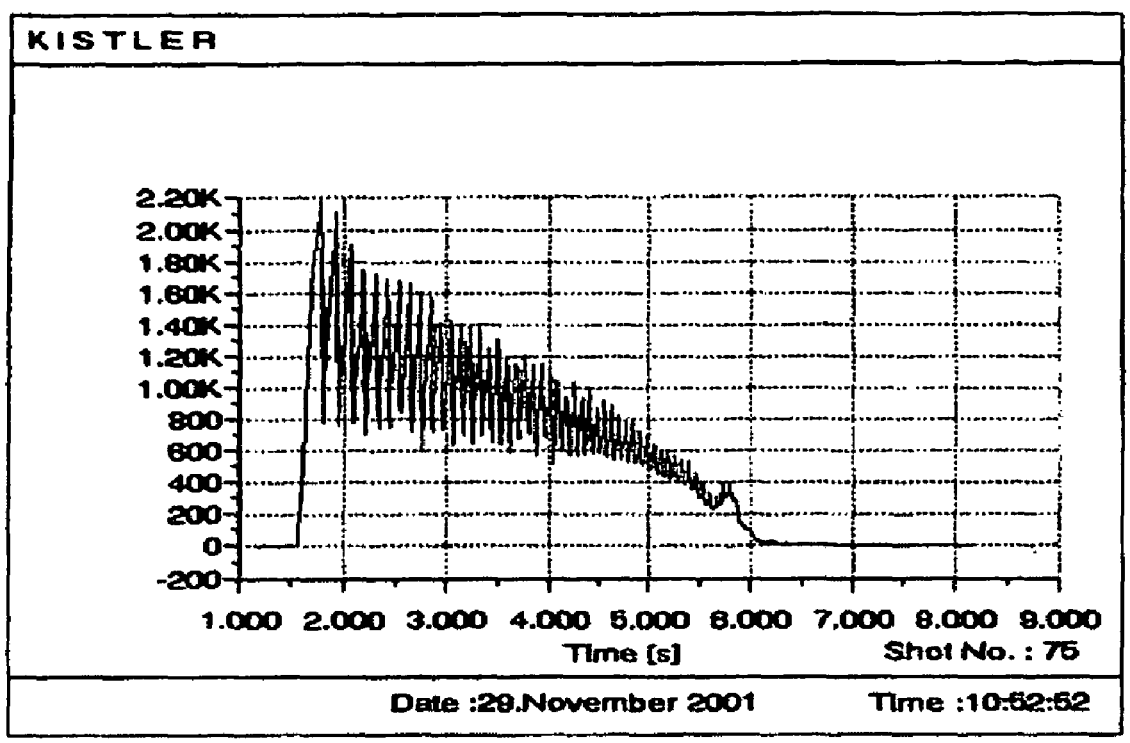
Figure 3:
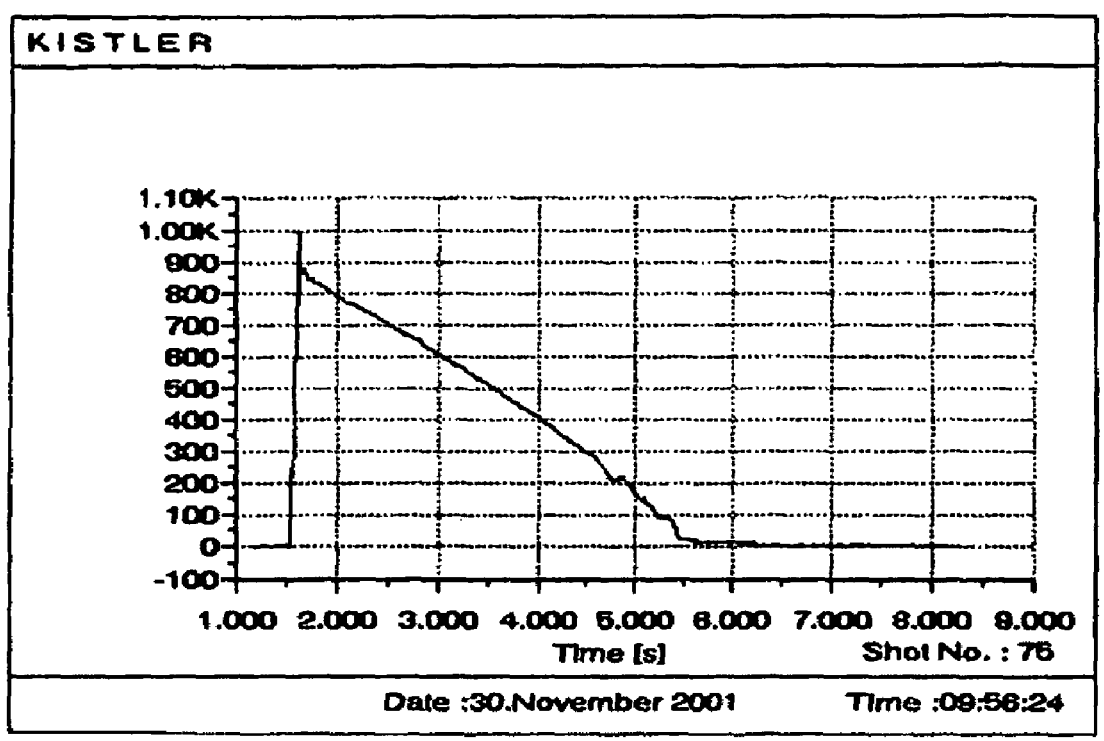

FIG. 1 is a graphical presentation of the detailed force registration shown as release force (as measured with the Kistler element) (Y-axis) as a function of time (X-axis), for the $75^{th}$ shot, under the conditions of Comparative experiments A;

FIG. 2 is a graphical presentation of the detailed force registration, shown as release force (as measured with the Kistler element) (Y-axis), as a fraction of time (X-axis) for the $75^{th}$ shot, under conditions of comparative experiment B; and FIG. 3 is a graphical presentation of the detailed force registration, shown as release force (as measured with the Kistler element) (Y-axis), as a fraction of time (X-axis) for the $75^{th}$ shot, under the conditions of an embodiment of the invention as described in Example 1.

The thermoplastic composition according to the invention enables a very regular injection moulding processing, with lower release forces needed during demoulding of parts. A further advantage is that virtually no additional sounds, like squeaking, are made during processing. A still further advantage is that the total moulding cycle-time for a given part can be reduced, contributing to a more economic process. Furthermore, no slip-stick effects are observed during demoulding, leading to very smooth surfaces of moulded parts.

It is rather surprising to find that these specific compounds form a synergetic combination showing such advantageous properties of a thermoplastic composition, since use of both compounds as release agents per se is known, even from one publication: in U.S. Pat. No. 4,626,566 pentaerythritol tetrastearate is used in comparative experiments.

It is true that in U.S. Pat. No. 4,626,566 a general remark is made that the composition comprising alpha-olefin oligomer may further comprise lubricants such as the synthetic and naturally occurring polyol esters, but the combination according to the present invention is not specifically disclosed, nor is it suggested that such combination would show any synergetic effect as described in the present invention.

U.S. Pat. No. 5,717,021 teaches to add 0.1-8 mass % of an aliphatic $C_4$-$C_{16}$ polyalpha olefin oligomer to a polycarbonate composition to improve its melt flow characteristics, which composition may further comprise a mould release agent. Specifically disclosed, however, are only compositions containing 0.15 mass % of pentaerythritol tetrastearate and 0.5-6 mass % of a polybutene copolymer of isobutylene and butene; whereas mould release behaviour is not addressed.

The thermoplastic composition according to the invention comprises an aromatic polycarbonate and/or a polyester. In principle, any known aromatic polycarbonate may be used. Suitable aromatic polycarbonates in this composition are polycarbonates made from at least one dihydric phenol and a carbonate precursor, for example by using an interfacial polymerisation process.

Suitable dihydric phenols that may be applied are compounds with one or more aromatic rings containing two hydroxyl groups, each directly attached to a carbon atom of an aromatic ring. Examples of such compounds include 4,4'-dihydroxybiphenyl, 2,2-bis(4-hydroxyphenyl)propane (bisphenol-A),
2,2-bis(4-hydroxy-3-methylphenyl)propane,
2,2-bis-(3-chloro-4-hydroxyphenyl)-propane,
2,2-bis-(3,5-dimethyl-4-hydroxyphenyl)-propane,
2,4-bis-(4-hydroxyphenyl)-2-methylbutane,
2,4-bis-(3,5-dimethyl-4-hydroxyphenyl)-2-methylbutane,
4,4-bis(4-hydroxyphenyl)heptane, bis-(3,5-dimethyl-4-hydroxyphenyl)-methane,
1,1-bis-(4-hydroxyphenyl)-cyclohexane, 1,1-bis-(3,5-dimethyl-4-hydroxyphenyl)-cyclohexane,
2,2-(3,5,3',5'-tetrachloro-4,4'-dihydroxybiphenyl)propane,
2,2-(3,5,3',5'-tetrabromo-4,4'-dihydroxybiphenyl)propane,
(3,3'-dichloro-4,4'-dihydroxyphenyl)methane,
bis-(3,5-dimethyl-4-hydroxyphenyl)-sulfone, bis-4-hydroxyphenylsulfone,
bis-4-hydroxyphenylsulfide.

The carbonate precursor can be a carbonyl halogenide, a halogen formiate or a carbonate ester. Examples of carbonyl halogenides include carbonyl chloride and carbonyl bromide. Examples of suitable halogen formiates are bis-halogen formiates of dihydric phenols like hydrochinon or of glycols like ethylene glycol. Examples of suitable carbonate esters include biphenyl carbonate, di(chlorophenyl)carbonate, di(bromophenyl)carbonate, di(alkylphenyl)carbonate, phenyltolyl carbonate and mixtures thereof. Although other carbonate precursors may be used as well, carbonylhalogenides and especially carbonylchloride, better known as phosgene, are preferred.

The aromatic polycarbonates in the composition according to the invention may be produced from said compounds with known methods of preparation. In general, also a catalyst, an acid acceptor, and a compound for controlling the molar mass of the polycarbonate are used.

Examples of a catalyst that may be used include tertiary amines like triethyl amine, tripropyl amine and N,N-dimethyl aniline, quaternary ammonium compounds like tetraethylammonium bromide en quaternary phosphonium compounds such as methyltriphenyl phosphoniumbromide.

Examples of suitable acid acceptors include organic compounds like pyridine, triethyl amine, dimethyl aniline. Examples of inorganic acid acceptors are hydroxides, carbonates, bicarbonates and phosphates of an alkali- or earthalkali metal. Examples of compounds that can be used for controlling the molecular mass include monohydric phenols like phenol, p-alkylphenols, para-bromophenol and secundary amines.

Within the definition of polycarbonate are also copolycarbonates made from at least two dihydric phenols and copolyester-carbonates, that are copolymers made from a dihydric phenol, a dicarboxylic acid and a carbonate precursor.

Such aromatic polycarbonates, and their preparation and properties have been extensively described in for example Encycl. Polym. Sci. Eng., 11, p. 648-718 (Wiley, New York, 1988); or in Kunststoff Handbuch, 3/1, p. 117-297 (Hanser Verlag, Muenchen, 1992).

In a special embodiment, the composition according to the invention contains a polycarbonate made from bisphenol-A and phosgene, and optionally minor amounts of other compounds with one, two, or more reactive groups, the latter compounds as comonomers, for example to affect the melt viscosity of the polymer. Such polymers, often referred to as bisphenol-A polycarbonate, or even simply polycarbonate (PC), are commercially available and are advantageously used as a construction material.

The thermoplastic composition according to the invention may also comprise a polyester. In principle, all current thermoplastic polyesters and copolyesters can be used as the thermoplastic polyester in the composition according to the invention.

Examples of such polyesters include essentially linear polyesters made via a condensation reaction of at least one dicarboxylic acid (diacid), or an ester-forming derivative thereof, and at least one dihydric alcohol (diol). The diacid and diol may both be either aliphatic or aromatic, but especially aromatic and partly aromatic polyesters are of interest as thermoplastic moulding materials in view of their high softening points and hydrolytic stability. Aromatic polyesters, also referred to as polyarylates, have essentially all ester linkages attached to aromatic rings. They may be semi-crystalline and even show liquid crystalline behaviour, or amorphous.

Partly aromatic polyesters, obtained from at least one aromatic dicarboxylic acid (diacid), or an ester-forming derivative thereof, and at least one aliphatic diol are the preferred polyesters for the present invention. Examples of suitable aromatic dicarboxylic acids include terephthalic acid, 1,4-naphthalenedicarboxylic acid, or 4,4'-biphenyldicarboxylic acid. Suitable aliphatic diols are alkylene diols, especially those containing 2-6 C-atoms, preferably 2-4 C-atoms. Examples thereof include ethylene glycol, propylene diols and butylene diols. Preferably ethylene glycol, 1,3-propylene diol or 1,4-butylene diol are used, more preferably 1,4-butylene diol. Suitable partly aromatic polyesters are polyalkylene terephthalates, for example polyethylene terephthalate (PET), polypropylene terephthalate (PPT), or polybutylene terephthalate (PBT); polyalkylene naphthalates, for example polyethylene naphthalate (PEN), polybutylene naphthalate (PBN); polyalkylene dibenzoates, for example polyethylene bibenzoate; and blends or copolyesters hereof. Preferably, PET, PBT, PEN and PBN are used, more preferably PBT and PET, because of their commercial availability and advantageous combination of processing and performance properties.

Such partly aromatic polyesters may optionally also contain a minor amount of units derived from other dicarboxylic acids, for example isophthalic acid, or other diols like cyclohexanedimethanol, which generally lowers the melting point of the polyester. The amount of other diacids or diols is preferably limited, unless it is desired to reduce the semi-crystalline character of the polyester.

A special group of partly aromatic polyesters are so-called segmented or block copolyesters which, in addition to polyester segments from the above group of partly aromatic polyesters, called hard segments, also contain so-called soft segments. Such soft segments are derived from a flexible polymer; that is a substantially amorphous polymer with a low glass-transition temperature ($T_g$) and low stiffness, having reactive end-groups, preferably two hydroxyl groups. Preferably the $T_g$ is below 0° C., more preferably below –20, and most preferably below –40° C. In principle various different polymers can be used as soft segment, suitable examples are aliphatic polyethers, aliphatic polyesters, or aliphatic polycarbonates. The molar mass of the soft segments may vary within a wide range, but is preferably chosen between 400 and 6000 g/mol. These block copolyesters, especially polyether esters, are useful as thermoplastic elastomers.

Above mentioned thermoplastic polyesters, their preparation and properties are extensively described in for example "Encyclopedia of Polymer Science and Engineering", Vol. 12, p. 1-75 and p217-256; John Wiley & Sons (1988), and in "Ullmann's Encyclopedia of Industrial Chemistry", Vol. A21, p.227-251; VCH Publishers Inc (1992); and in the references mentioned therein.

The thermoplastic composition according to the invention may also comprise a blend of aromatic polycarbonate and polyester. In such blend both the polycarbonate and/or the polyester can be the major component; that is form a continuous phase or matrix. The ratio between the polycarbonate and the polyester may vary between wide limits, e.g. from 1/9 to 9/1. The advantage of these blends is that an optimum combination of properties may be obtained. Preferably, the composition comprises a blend of bisphenol-A polycarbonate and polybutylene terephthalate.

The composition according to the invention comprises an effective amount of (b1) a fatty acid ester of an aliphatic polyol having 2-6 hydroxy groups and an aliphatic $C_{10}$-$C_{38}$ carboxylic acid, and (b2) a saturated alpha-olefin oligomer of at least one $C_6$-$C_{18}$ alpha-olefin as mould release agent. An effective amount is understood to be any amount that reduces the force needed to eject an article from a mould and to obtain an article without distinct surface defects or distortions, as compared to a situation wherein no MRA is used.

The composition according to the invention contains at least one fatty acid ester of an aliphatic polyol having 2-6 hydroxy groups and an aliphatic $C_{10}$-$C_{36}$ carboxylic acid as component (b1). Such compounds are well known, as are methods for their preparation. These compounds are monomeric polyesters made by reacting a polyol and a fatty acid. All or only part of the hydroxyl groups in the polyol may be esterified, depending on the molar ratio of fatty acid to hydroxyl groups. Preferably, the composition contains a fatty acid ester that has still some hydroxyl-functionality, since these compounds are found to be more effective.

Both the aliphatic polyol and aliphatic carboxylic acid may be linear or branched. Preferably, the polyol and the carboxylic acid are fully saturated, because such compounds show better thermal stability.

Examples of suitable aliphatic polyols (polyhydric alcohols) having 2-6 hydroxy groups include alkylene glycols, like ethylene glycol, propylene glycol, neopentyl glycol; polyglycols like diethylene glycol; glycerol, trimethylolethane, trimethylolpropane, ditrimethylolpropane, pentaerythritol, sorbitol, or mannitol. Mixtures of these compounds may also be used.

Preferably, the polyol in component (b1) has 3-4 hydroxy groups. Examples thereof include glycerol, trimethylolethane, trimethylolpropane, ditrimethylolpropane, and pentaerythritol. Compounds (b1) derived herefrom show good compatibility with the polymer in the composition.

Examples of suitable aliphatic $C_{10}$-$C_{36}$ carboxylic acid include capric acid, lauric acid, palmitic acid, stearic acid, behenic acid and montanic acid. Mixtures of these compounds may also be used.

Preferably, the carboxylic acid contains 12-30; more preferably 14-28 carbon atoms. Most preferably the carboxylic acid in component (b1) is a $C_{16}$-$C_{22}$ fatty acid, because then an optimum balance is reached between compatibility of the fatty acid ester with the polymer and component (b2) in the composition and release performance. Very good results are obtained with esters of stearic acids, for example with compositions comprising glycerol monostearate, glycerol tristearate, and especially pentaerythritol tetrastearate as component (b1). Such compounds are commercially available from various sources.

The composition according to the invention contains at least one saturated alpha-olefin oligomer of at least one $C_6$-$C_{18}$ alpha-olefin as component (b2). Such compounds and their preparation are known in the art. The compounds can for example be made by catalytic oligomerisation of an alpha-olefin, followed by hydrogenation to remove unsaturation. Such compounds are of oily or waxy nature, and show good fluidity over a wide temperature range. The compound is generally a mixture of oligomers of different degrees of polymerisation, branching and isomerisation, depending on their preparation. Suitable products generally have a molar mass (meant is number averaged molar mass, $M_n$, unless indicated otherwise) from about 250 up to several thousands. In view of their viscosity, alpha-olefin oligomers with a molar mass below about 1000 g/mol are preferred, more preferably the molar mass is about 400-800 g/mol, most preferably the molar mass is about 450-650 g/mol. This provides a better balance of material handling and release behaviour of the thermoplastic composition.

The saturated alpha-olefin oligomer may be derived from a number of different alpha-olefins or mixtures thereof, but preferably component (b2) is an oligomer of a $C_8$-$C_{12}$ or even a $C_9$-$C_{11}$ poly-alpha-olefin, in order to optimise compatibility and release behaviour. Excellent results are obtained with a composition comprising as component (b2) oligomers of a $C_{10}$ poly-alpha-olefin. Such compounds are for example commercially available from BP Chemicals under the trade name Durasyn®.

The mass ratio between the two components (b1) and (b2) in the thermoplastic composition according to the invention can in principle vary between wide limits to show improved mould release behaviour. Preferably, the mass ratio of components (b1) and (b2) is from 1/9 to 9/1, to markedly reduce slip-stick effects. Lower ejection forces are especially obtained, when the mass ratio of components (b1) and (b2) is from 1/6 to 6/1, from 1/4 to 4/1, more preferably from 1/3 to 3/1, even more preferably from 2/3 to 3/2. Also a combination of any of the upper and lower ranges may be applied. Very good overall processing and demoulding behaviour was found for compositions wherein the mass ratio of components (b1) and (b2) is about 1/1.

The composition according to the invention comprises an effective amount of the above described components as mould release agent. Generally, an amount of from about 0.01 mass % is needed to have any effect. Using more than about 3 mass % adds in general little to release performance, but may have negative effects on other properties or processing behaviour. Preferably, the amount of mould release agent (b) is about 0.05-2 mass %, more preferably 0,1-1 mass %, even more preferably 0,25-0,75 and still more preferably about 0,4-0,6 mass % to optimise processing and demoulding behaviour.

A thermoplastic composition comprising bisphenol-A polycarbonate as (a) and 0.4-0.6 mass % of a 2/3 to 3/2 mixture of pentaerythritol tetrastearate and a $C_{10}$ alpha-olefin oligomer as (b) shows remarkably good processing and mould release behaviour even when being processed into large complicated products.

An additional advantage of the mould release system according to the invention is that it does not deteriorate optical transparency of a polycarbonate composition.

The thermoplastic composition according to the invention generally contains at least one polycarbonate and/or at least one polyester polymer as a major component; which is forming a continuous or matrix phase of the composition. The composition may comprise from 99.99 to 30 mass % of at least one of said polymers, preferably at least 40, more preferably at least 50 mass %. The composition may further comprise up to 70 mass %, preferably up to 60 or 50 mass % of one or more other polymers, e.g. as impact-modifiers, filler materials and reinforcing agents, and/or flame retarding compounds.

Examples of other polymers that may be comprised in the composition according to the invention are known to the skilled person, and include polyolefins like ethylene (co) polymers and ethylene-propylene elastomers, optionally modified or functionalised to improve compatibility with polyesters; styrenic copolymers, like (modified) styrene-butadiene block-copolymers (SBS, SEBS), styrene-acrylonitril copolymers (SAN), or acrylonitrile-butadiene-styrene copolymers (ABS); acrylonitrile-ethylene-propylene-styrene copolymers (AES); acrylonitrile-acrylic elastomer-styrene copolymers (AAS); (meth)acrylic copolymers, like ethylene-alkyl(meth)acrylate copolymers, or terpolymers further comprising glycidyl(meth)acrylates. Polyester-based compositions preferably comprise at least one of the latter terpolymers as impact-modifier, optionally in combination with non-functional or non-reactive copolymers. In a preferred embodiment, a polycarbonate-based composition further contains SAN and/or ABS copolymers. Such a PC/ABS composition, comprising the release agent according to the invention was found to show markedly improved mould release behaviour.

Examples of suitable filler materials include various mineral particles, like mica, talcum, clay and the like. Suitable reinforcing agents include, for example, glass fibres, carbon fibres and mineral fibres. Glass fibres are preferred, and are generally provided with a suitable sizing agent As flame retarding compounds any compound known to be effective in polycarbonate and/or polyester compositions may be applied, both halogenated and halogen-free compounds. Preferably, the composition comprises a halogen-free flame retarding compound, like a phosphorous-containing compound. Preferred compounds include phosphoric esters, like triphenylphosphate (TPP); resorcinol bis(diphenylphosphate) (RDP), bisphenol A bis(diphenylphosphate) (BDP) or substituted derivatives or oligomers of these; or metal-phosphinates, optionally in combination with nitrogen-compounds.

The composition may further comprise any customary additives, like heat- and UV-stabilisers, anti-oxidants, other processing aids, nucleating agents, colorants and anti-dripping agents, generally in minor amounts of up to several mass % each.

The composition according to the invention can be obtained by mixing or blending the various components applying known techniques. The mixing may be a 'dry' blending operation, wherein the various components are mixed below the melt-processing temperatures of the polycarbonate and/or polyester; or a melt-blending process, wherein the components, optionally pre-blended, are mixed at suitable melt-processing temperatures, e.g. in a single- or twin-screw extruder. Also a combination of dry- and melt-blending techniques can be applied.

The invention also relates to the use of the thermoplastic composition according to the invention for injection moulding of articles, since these novel compositions show advantageous properties during injection moulding operation; that is a very stable operation, easy mould release without slip-stick effects, and shorter overall moulding cycles.

The invention further concerns moulded articles made from the thermoplastic composition according to the invention, especially via an injection moulding process. Such moulded articles can be made with less surface defects originating from demoulding operation, like streakes or scratches, and can be produced with shorter moulding cycle-time, thus at lower cost.

The invention will now be further illustrated with the following examples and comparative experiments.

Materials

Following materials were used:

PC a bisphenol-A polycarbonate with Limiting Viscosity Number of 46 ml/g (as determined on a solution is dichloromethane at 25° C.; ISO 16828/4); available as Xantar® 19 R (DSM Engineering Plastics, NL);

PETS pentaerythritol tetrastearate (actual degree of esterification about 88%); available as Loxiol® EP 861 (Cognis, DE);

GMS glycerol monosterate; available as Loxiol® EP12 (Cognis, DE);

PAO1 saturated alpha-olefin oligomer of 1-decene, $M_n$ about 450 g/mol; Durasyn 164 (BPChemicals, BE);

PAO2 saturated alpha-olefin oligomer of 1-decene, $M_n$ about 570 g/mol; Durasyn 166 (BPChemicals, BE).

Injection moulding

Mould release performance of different compositions was evaluated during injection moulding of a cylindrical beaker (of diameter 60 mm, height 70 mm and wall thickness of 1.8 mm) with a demoulding angle of 0° on an Engel 80 machine. Temperature settings of the cylinder were 280-290° C. (from hopper to nozzle), resulting in a melt temperature of 305° C. and the mould was kept at a constant temperature of 80° C. The mould was equipped with ejector pins, of which one was connected to a Kistler type 9021A force transducer. After initially discarding about 25 shots, demoulding forces were automatically registered and monitored during moulding of at least 75 subsequent shots. From shot numbers 1, 30 and 75 a detailed force registration with time was made. The average release force is calculated as the average value of the maximum in the demoulding force registered during 75 shots.

Comparative Experiment A.

A composition comprising PC, 0.3 mass % of PETS, and 0.2 mass % of GMS was made by melt mixing the components on a ZSK25 twin-screw extruder, and drying the obtained granules.

Mould release performance was evaluated as indicated above; the results are summarized in Table 1. In FIG. 1 the detailed force registration is presented for shot number 75. Shown is the release force (as measured with the Kistler element) as a function of time.

Comparative Experiments B and C.

Similar to comparative experiment A, compositions were made and tested; except that in B the composition contains 0.6 mass % of PAO1 as MRA; and in C 0.6 mass % of PAO2 is used. Results are given in Table 1. In FIG. 2 the detailed force registration for shot number 75 of Comp exp. B is presented. The oscillation in the registered force represents the slip-stick behaviour also observed visually: the part is not ejected in a smooth single movement. Visually examining the surface of the part also reveals a wave-like pattern.

EXAMPLE 1

Analogous to the other experiments, a composition was made with the following combination as MRA: 0.15 mass % of PETS, 0.1 mass % of GMS and 0.3 mass % of PAO1.

The results are presented in Table 1 and FIG. 3 (representing the detailed force registration for shot number 75). Note the very smooth curve and the low maximum force value. The surface quality of moulded parts was found to be excellent.

EXAMPLE 2

For testing on semi-industrial scale a composition comprising PC, 0.3 mass % of PETS and 0.3 mass % of PAO2 was made by melt mixing the components on a ZSK70 twin-screw extruder, and drying the obtained granules.

The composition was processed into a tray-like part of approximately 57*57*8 cm, with walls showing very little draft, using an Engel 3002 (800 tons) injection moulding machine at standard temperature settings. The part had a mass of about 2.2 kg. Processing appeared to be very smooth and stable, and no demoulding problems were encountered. By further optimising processing settings, the total cycle-time per shot could be reduced from 100 s to 80 s (i.e. a reduction of about 20%). The moulded part had excellent transparency and was virtually free from surface defects.

Comparative Experiments D and E

Analogous to Example 2 compositions containing 0.6 mass % of PAO2 and PETS, respectively, were made and subsequently processed into the same part. In both cases release problems and irregular processing were encountered. During demoulding of a part made from composition D, a squeaking sound was made. Stable processing appeared only possible, when total cycle-time was significantly increased.

TABLE 1

| | MRA | Average release force (N) | observations |
|---|---|---|---|
| Comp. Exp. A | 0.3 PETS 0.2 GMS | 1300 | Constant release force; No slip-stick effect |
| Comp. Exp. B | 0.6 PAO1 | 2100 | Increasing from 2000 to 2100 N; Slip-stick effect |
| Comp. Exp. C | 0.6 PAO2 | 1750 | Increasing from 1600 to 1900 N; Slip-stick effect |
| Example 1 | 0.15 PETS 0.1 GMS 0.3 PAO1 | 1000 | Constant release force; no slip-stick effect |
| Example 2 | 0.3 PETS 0.3 PAO2 | n.d. | Problem-free processing; Excellent surface quality |
| Comp. Exp. D | 0.6 PAO2 | n.d. | Troublesome demoulding; squeaking |
| Comp. Exp. E | 0.6 PETS | n.d. | Troublesome demoulding; irregular |

From these experiments it can be concluded that a thermoplastic composition comprising polycarbonate and a MRA containing both a fatty acid ester and a saturated alpha-olefin oligomer, shows significantly better demoulding behaviour during injection moulding than compositions containing only one of said compounds: a very stable moulding process, no slip-stick behaviour, no unpleasant squeaking noises, and lower release forces during ejection of a part. At similar concentration, the present MRA according to the invention shows a synergetic effect over each of its components. The obtained moulded parts also showed better surface quality, due to the absence of demoulding-related surface defects.

The invention claimed is:

1. Thermoplastic composition comprising (a) an aromatic polycarbonate or a blend of aromatic polycarbonate and polyester, in which the polycarbonate forms the continuous phase, and (b) a mould release agent, wherein the composition comprises 0.01-3 mass % of a mould release agent that contains:
   (b1) a fatty acid ester of an aliphatic polyol having 2-6 hydroxy groups and an aliphatic $C_{10}$-$C_{36}$ carboxylic acid; and
   (b2) a saturated alpha-olefin oligomer of at least one $C_6$-$C_{18}$ alpha-olefin; and wherein
   components (b1) and (b2) are present in a mass ratio of (b1) to (b2) of from 1/3 to 3/1.

2. Thermoplastic composition according to claim 1, wherein (a) is bisphenol A polycarbonate.

3. Thermoplastic composition according to claim 1, wherein the polyol in component (b1) has 3-4 hydroxy groups.

4. Thermoplastic composition according to claim 1, wherein the carboxylic acid in component (b1) is a $C_{16}$-$C_{22}$ fatty acid.

5. Thermoplastic composition according to claim 1, wherein component (b1) comprises pentaerythritol tetrastearate.

6. Thermoplastic composition according to claim 1, wherein component (b2) has a molar mass of about 400-800 g/mol.

7. Thermoplastic composition according to claim 1, wherein component (b2) is an oligomer of a $C_8$-$C_{12}$ alpha-olefin.

8. Thermoplastic composition according to claim 1, wherein component (b2) is an oligomer of a $C_{10}$ alpha-olefin.

9. Thermoplastic composition according to claim 1, wherein the amount of mould release agent (b) is about 0.25-0.75 mass %.

10. An injection molded article comprising the thermoplastic composition according to claim 1.

11. Moulded articles made from the thermoplastic composition according to claim 1.

12. A method for making an injection molded article comprising injection molding a thermoplastic composition as set forth in claim 1.

* * * * *